United States Patent [19]
Omata et al.

[11] Patent Number: 5,339,175
[45] Date of Patent: Aug. 16, 1994

[54] IMAGE CAPTURE APPARATUS HAVING MEANS FOR DETECTING THE THICKNESS OF A DOCUMENT TO BE CAPTURED

[75] Inventors: Kyoichi Omata, Shinjuku; Nobuhiko Matsui, Yokohama, both of Japan

[73] Assignee: Eastman Kodak Company, Rochester, N.Y.

[21] Appl. No.: 28,100

[22] Filed: Mar. 8, 1993

[30] Foreign Application Priority Data

Apr. 21, 1992 [JP] Japan .................. 4-101001

[51] Int. Cl.$^5$ .............................................. H04N 1/04
[52] U.S. Cl. ..................... 358/498; 358/496
[58] Field of Search ............... 358/496, 497, 498, 474; 355/23, 24, 25, 308, 309; H04N 1/04

[56] References Cited

U.S. PATENT DOCUMENTS

| | | | |
|---|---|---|---|
| 4,475,128 | 10/1984 | Koumura | 358/482 |
| 4,949,189 | 8/1990 | Ohmori | 358/482 |
| 5,091,754 | 2/1992 | Abe et al. | 355/308 |
| 5,130,807 | 7/1992 | Tanabe et al. | 358/498 |

*Primary Examiner*—Edward L. Coles, Sr.
*Assistant Examiner*—Kim Yen Vu
*Attorney, Agent, or Firm*—Raymond L. Owens

[57] ABSTRACT

An image capture apparatus optically scans a document as the document is being transported, and includes transporting means, a read section including first and second plates, detecting means, and actuator means. The transporting means moves documents along a predetermined path. The first and second plates face each other and guide a document received from the transporting means. At least one of the first and second plates defines an aperture therein through which light from a light source is directed onto a prescribed region of the document in motion therebetween. The detecting means detects the thickness of the document moving along the predetermined path, and generates an output drive control signal representative of the thickness of the document. The actuator means is responsive to the drive control signals from the drive control means for moving at least one of the aperture plates in a direction that is perpendicular to a document scanning surface. The movement of the actuator means provides a minimum space between the document and the first and second plates that still allows passage of the document therebetween without the document oscillating from side to side or becoming wrinkled. The permits documents to be scanned and produce images thereof without distortion or blurring.

9 Claims, 2 Drawing Sheets

IMAGE CAPTURE APPARATUS HAVING MEANS FOR DETECTING THE THICKNESS OF A DOCUMENT TO BE CAPTURED

FIELD OF THE INVENTION

The present invention relates to an image capture apparatus, and, more particularly, to an image capture apparatus that is able to scan documents of differing thicknesses one at a time.

BACKGROUND OF THE INVENTION

An image capture apparatus is able to scan a document and convert the document image information thereon into representative digital electrical signals that are then transmitted to a user device, such as a computer, for processing. The ability of a user device to thus process document image data in the form of electrical signals makes it possible to store, retrieve, duplicate, and transmit large quantities of the document image data at high rates of speed. Such image capture apparatus provides for high-speed processing of the growing quantities of information generated by modern society.

Referring now to FIG. 1, there is shown a prior art image capture apparatus 30 that is able to simultaneously scan both sides of a document 60. The prior art image capture apparatus 30 comprises a document feeder section (FEEDER) 40 (shown within a dashed-line rectangle) that feeds documents 60 to be scanned one at a time into the image capture apparatus 30, a document transport section (DOC. TRANSPORT) 41 (shown within a dashed-line block) that transports the documents 60 from the document feeder section 40 in a first direction to a second direction orthogonal to the first direction, a read section (READ) 42 (shown within a dashed-line rectangle) where the documents 60 are received from the document transport section 41 and scanned, and a document exit section (EXIT) 43 (shown as a dashed-line rectangle without components) to which the documents 60 are sent that have been scanned in the read section 42.

In the document feeder section 40, the documents 60 are stacked in a feed tray 50 from where the documents 60 are fed preferably one at a time to the document transport section 41. Provided near the document feed tray 50 are a feed roller 51 and a mutually opposed retard roller 52. A topmost document 60 is drawn into the document transport section 41 by the counterclockwise rotation of a feed roller 51 (shown by the arrow within roller 51). At the same time, the counterclockwise rotation of a retard roller 52 (shown by the arrow within roller 52) serves to urge the documents 60 below the topmost document 60 on the stack of documents 60 back towards the document feed tray 50. The document transport section 41 comprises transport rollers 53, conveyor belt means 54, and pressure rollers 55 that convey each document 60 from the feeder section 40 to the read section 42. The read section 42 comprises two aperture plates 56 arranged in mutual opposition which are separated by a prescribed distance, two light sources 57, and two optical sensors 58. In the read section 42, a prescribed region (not shown) of each side of each document 60 passing between the aperture plates 56 is concurrently illuminated by a separate beam of light (not shown) from a separate light source 57 and concurrently scanned. Light reflected by each side of the document 60 is detected by a separate optical sensor 58, such as a charge-coupled device (CCD) or the like, that digitizes a stream of image data from the document 60 for transmission as representative electrical signals to a user device (not shown) such as a computer. After being scanned, the document 60 exits the image capture apparatus 30 via the document exit section 43.

Generally the documents 60 that are scanned by the prior art image capture apparatus 30 are of various thicknesses, ranging usually from about 0.04 mm to 0.4 mm. It follows that the aperture plates 56 have to be set far enough apart to allow the passage of the thickest documents 60. Still further, the documents 60 have to be properly supported as they pass through the space between the aperture plates 56, otherwise the positional condition of a document 60 and its image deteriorates. Therefore, the thinner the document 60 is, the more pronounced this deterioration becomes.

More specifically, with respect to the length of documents 60 relative to the direction of travel (shown by the arrow 62 in the exit section 43), for a long document 60, the leading edge of the document 60 conveyed into the aperture plates 56 is unsupported until the leading edge is between the guide rollers 59 that guide each document to the exit section 43. On the other hand, a document 60 that is shorter than a length of the aperture plates 56 is pitched unsupported through the aperture plates 56. Thus, when a document 60 that is to be scanned is thin so that there is a gap between the aperture plates 56 and the document 60, the scanning procedure gives rise to problems such as a wrinkling of the document 60, and a side-to-side movement of the document 60. This causes a distortion and blurring of text characters, drawings, and other such information included on the document 60 being scanned.

It is desirable to provide an image capture apparatus which scans documents of various thicknesses and lengths through a pair of mutually opposing aperture plates without the documents either oscillating from side-to-side or becoming wrinkled to thereby avoid distortion or blurring of the resulting images of the documents being scanned.

SUMMARY OF THE INVENTION

The present invention is directed to an image capture apparatus in which documents being scanned at an aperture plate section do not oscillate from side-to-side or become wrinkled, and which therefore enable images to be scanned without distortion or blurring.

In a first aspect of the present invention, the image capture apparatus comprises transporting means, first and second plates, detecting means, and actuator means. The transporting means moves documents along a predetermined path. The first and second plates face each other to guide a document in motion received from the transporting means. At least one of the first and second plates define an aperture therein through which light from a light source is directed onto a prescribed region of the document in motion therebetween. The detecting means detects the thickness of the document moving along the predetermined path and generating an output drive control signal representative of the thickness of the document. The actuator means is responsive to the drive control signals received from the drive control means for moving at least one of the aperture plates in a direction that is perpendicular to a document scanning surface to provide a minimum space between the document and the first and second plates that still allows passage of the document between the first and second plates.

In accordance with a second aspect of the invention, the image capture apparatus comprises transporting means, first and second plates, document thickness detection means, drive control means, and actuator means. The transporting means moves documents along a predetermined path. The first and second plates face each other and guide a document in motion received from the transporting means. At least one of the first and second plates defines an aperture therein through which light from a light source is directed onto a prescribed region of the document in motion therebetween. The document thickness detection means is provided in the predetermined path for detecting the thickness of the document moving along the predetermined path, and generates an output thickness measurement signal representative of the thickness of the document. The drive control means is responsive to the output thickness measurement signal for outputting drive control signals that correspond to the thickness of the document as detected by the document thickness detection means. The actuator means is responsive to the drive control signals received from the drive control means for moving at least one of the aperture plates in a direction that is perpendicular to a document scanning surface to provide a minimum space between the document and the first and second plates that still allows passage of the document between the first and second plates.

The present invention will be better understood from the following more detailed description taken with the accompanying drawings and claims.

The drawings are not necessarily to scale.

DETAILED DESCRIPTION

In the description hereinafter, corresponding elements having the same function in the various figures have been given the same designation number.

Figure 1:
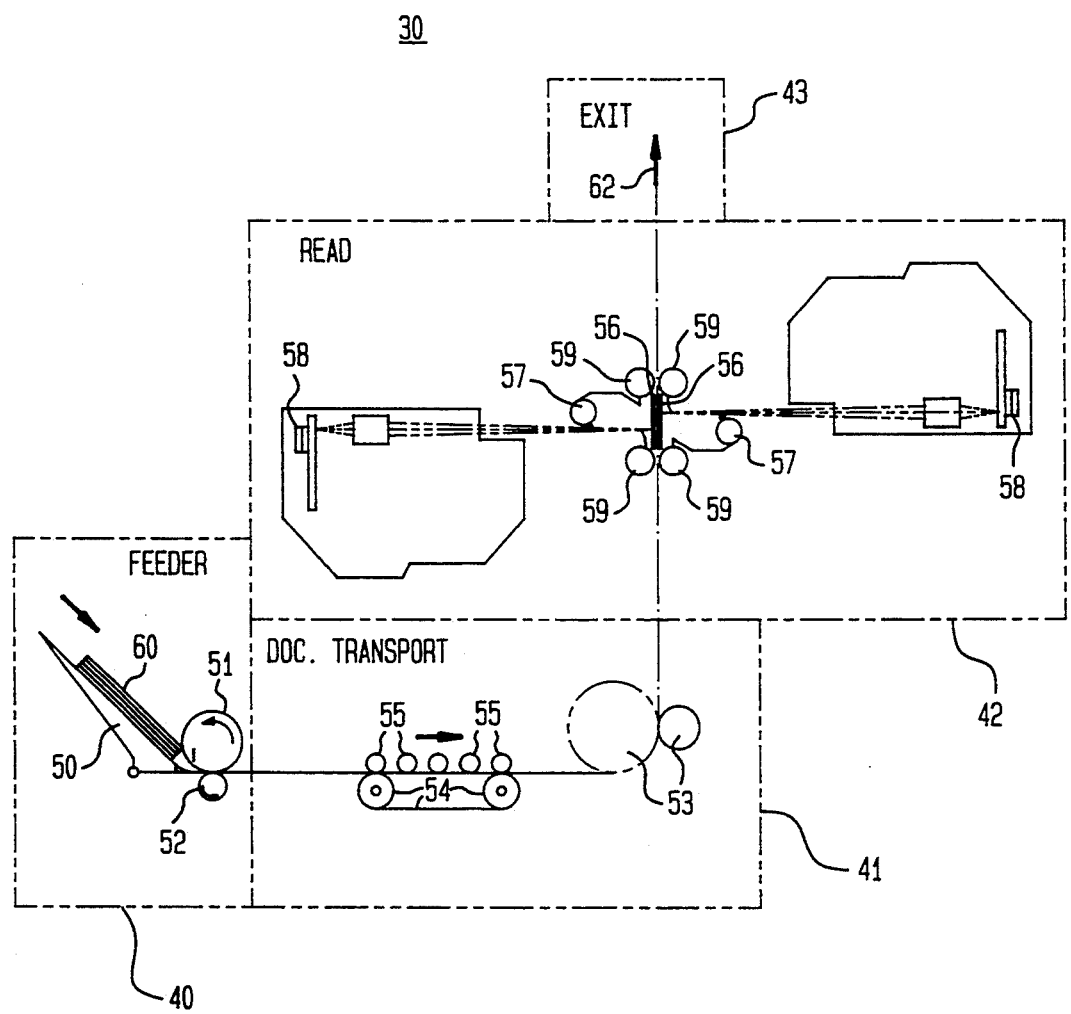
FIG. 1 is a block diagram of a prior art image capture apparatus.
Figure 2:
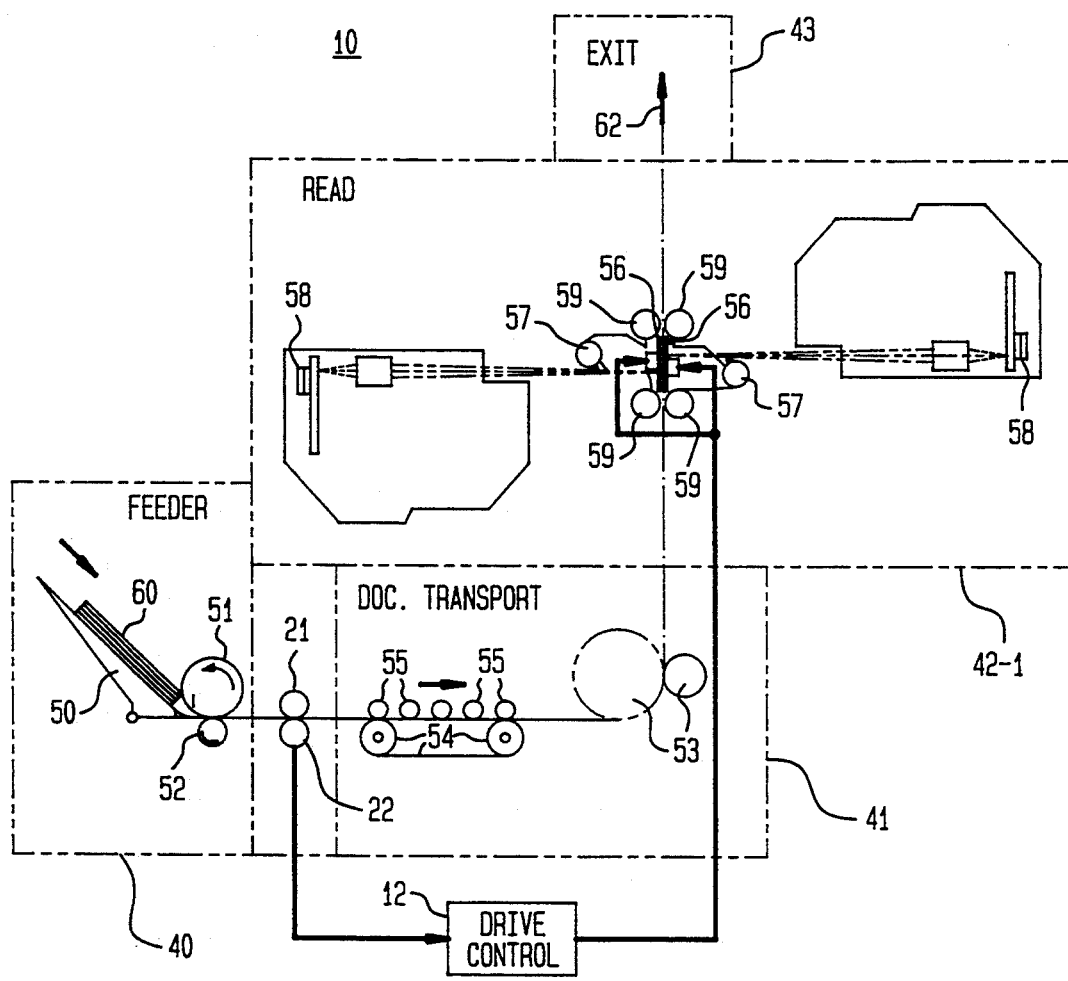
FIG. 2 is a block diagram showing an image capture apparatus in accordance with the present invention.

Referring now to FIG. 2, there is shown a block diagram of an image capture apparatus 10 in accordance with the present invention. The image capture apparatus 10 comprises a document feeder section (FEEDER) 40 (shown within a dashed-line rectangle), a thickness sensing section 11 (shown within a dashed-line rectangle), a drive control section 12, a document transport section (DOC. TRANSPORT) 41 (shown within a dashed-line rectangle), a read section (READ) 42-1 (shown within a dashed-line rectangle), and a document exit section (EXIT) 43 (shown as a dashed-line rectangle) to which the documents 60 are sent that have been scanned in the read section 42-1.

The document feeder section comprises a feed tray 50 in which documents 60 are stacked, a feed roller 51, and a mutually opposed retard roller 52. In the document feeder section 40, the documents 60 are stacked in the feed tray 50 from where they are fed to the document transport section 41. More particularly, the feed roller 51 and the mutually opposed retard roller 52 are provided near the document feed tray 50. A topmost document 60 is drawn into the document transport section 41 by a counterclockwise rotation (shown by the arrow within roller 51) of the feed roller 51, while at the same time a counterclockwise rotation (shown by the arrow within roller 52) of the retard roller 52 serves to urge documents 60 below the topmost document 60 in the stack back towards the document feed tray 50.

The document transport section 41 comprises conveyor belt means 54, pressure rollers 55, and transport rollers 53. The document transport section 41 transports each of the documents 60 received from the document feeder section 40 in a first direction by the conveyor belt means 54 and the pressure rollers 55. The transport rollers 53 redirects each of the documents 60 moving in the first direction into the read section 42-1 in order to scan the document.

The read section 42-1 comprises two aperture plates 56 arranged in mutual opposition which are separated by a prescribed distance, actuators 13, two light sources 57, and two optical sensors 58. In the read section 42-1, a predetermined region (not shown) on each side of each document 60 passing between the aperture plates 56 is concurrently illuminated by a separate beam of light (not shown) from a separate light source 57 and concurrently scanned as it passes between the first and second aperture plates 56. An image of the predetermined region of the document produced by light reflected by each side of the document 60 is detected by a separate optical sensor 58, such as a charge-coupled device (CCD) or the like. The optical sensor 58 digitizes a stream of image data received from the document 60 for transmission as representative electrical signals to a user device (not shown) such as a computer. After being scanned, the document 60 exits the read section 42-1 via the document exit section 43.

The thickness sensing section 11, disposed between the feeder section 40 and the document transport section 41, comprises a pair of rollers 21 and 22 each mounted on a shaft (not shown), and a displacement detection section (not shown) associated with the rollers 21 and 22 for calculating a displacement amount of the rollers 21 and 22 when a document 60 is passed therebetween. More particularly, the shaft of at least one of the rollers 21 and 22 is supported so as to be vertically movable to form the displacement detection section. Thus, the movable roller 21 or 22 is displaced vertically by an amount that corresponds to the thickness of each document 60. In this manner, the thickness of a document 60 is calculated by the displacement detection section based on the distance between, for example, the shafts of the two rollers 21 and 22, and a representative document thickness control signal is transmitted to the drive control circuit 12.

Based on the thickness of the document 60 as detected by the thickness sensing section 11, the drive control section 12 is responsive to the received document thickness control signal to generate a corresponding drive control signal to the actuators 13 in the read section 42-1. Such drive control signal is used to control the spacing between the document 60 and the first and second aperture plates 56 to achieve the minimum space that still allows passage of the document 60 between the first and second aperture plates 56. Still further, such minimum space allows passage of the document between the first and second aperture plates 56 without the document oscillating from side-to-side or becoming wrinkled. This permits documents to be scanned while producing images thereof without distortion or blurring.

Referring now to FIG. S, there is shown an enlarged view in perspective of the area of the first and second aperture plates 56 of the image capture apparatus 10. At least one end of each of the first and second aperture plates 56 is provided with an actuator 13 for moving the corresponding aperture plate 56 in a direction that is perpendicular to a scanning surface of the document 60 in response to drive control signals from the drive control section 12. To ensure a smooth drive action, each end of the first and second aperture plates 56 is moveably coupled by at least one guide bar 14 (two guide bars are shown for each end) to an opposing end of the facing aperture plate 56.

In accordance with the present invention, at least one of the aperture plates 56 is moved toward a document 60 when the incoming document 60 is a thin one, and away from the incoming document 60 when the document is a thick one. Thus, even when the documents 60 are of different thicknesses, the aperture plates 56 are controlled so that the spacing between document 60 and aperture plates 56 is always at the minimum that still allows passage of the document 60 between the aperture plates 56 without the document oscillating from side-to-side or becoming wrinkled.

In the operation of the image capture apparatus 10, the documents 60 are stacked in the feed tray 50 of the feeder section 40. A topmost document is drawn into the document transport section 41 by the counterclockwise rotation of the feed roller 51, while at the same time the counterclockwise rotation of the retard roller 52 serves to urge the documents below the topmost one back towards the document feed tray 50. The document 60 brought into the document transport section 41 passes between the rollers 21 and 22 of the thickness sensing section 11. The degree of displacement thus produced between the shafts of the rollers 21 and 22 is used by the displacement detection section (not shown but associated with the rollers 21 and 22) to measure the thickness of the document 60. The document 60 is then conveyed to the read section 42-1 by the action of the conveyor belt 54, the pressure rollers 55, and the transport rollers 53.

The result of the displacement measurement made by the thickness sensing section 11 is input to the drive control section 12. In response to such displacement measurement, the drive control section 12 outputs drive control signals to the actuators 13 in the read section 42-1 to adjust the spacing between document 60 and aperture plates 56 to the minimum space that still allows passage of the document 60. In response to the received drive control signals, the actuators 13 move one or both of the aperture plates 56 perpendicularly to the scanning surface of the document 60. Specifically, one or more of the aperture plates 56 are moved toward each other when the incoming document 60 is a thin one, and one or more of the aperture plates 56 are moved away from each other when the incoming document 60 is a thick one.

Figure 3:
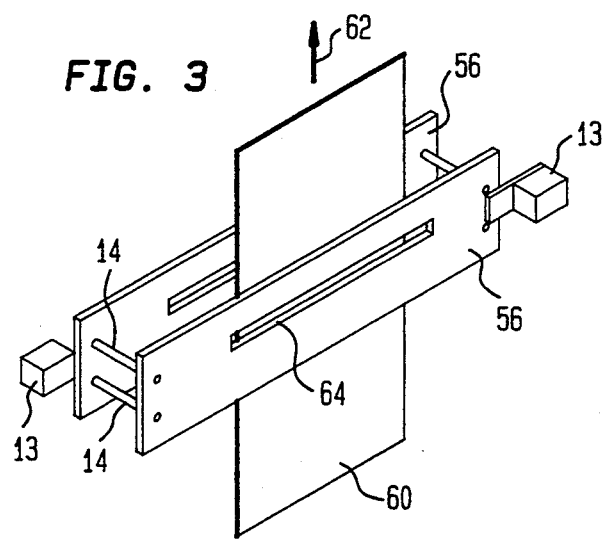
FIG. 3 is a view in perspective of an aperture plate section of the image capture apparatus of FIG. 2 in accordance with the present invention.

In order to scan each document 60 moving between the aperture plates 56, a prescribed region of each side of the document 60 is illuminated by light projected from the light source 57 (only shown in FIG. 2) via a slot 64 (shown in FIG. 3) defined in the aperture plate 56. The image of the prescribed region produced by light reflected from the illuminated prescribed region of the document 60 is detected by the optical sensor 58, which is a charge-coupled device or other such means. In the optical sensor 58, the stream of image data is digitized and sent to a processing means (not shown) such as a computer. After being scanned, each document 60 is ejected in the direction of arrow 62 from the read section 42-1 and the apparatus 10 via the document exit section 43.

It is to be appreciated and understood that the specific embodiments of the invention described hereinbefore are merely illustrative of the general principles of the invention. Various modifications my be made by those skilled in the art which are consistent with the principles set forth. For example, although the invention has been described with reference to an image capture apparatus 10 with two optical sensors 58 to simultaneously scan both sides of a document 60, the scanning and control arrangement of the present invention can be applied with the same effect to an arrangement in which only one side of a document 60 is read. Still further, the present invention is not limited to an arrangement in which the thickness of a document 60 is measured by detecting changes in the distance between the shafts of the pair of rollers 21 and 22. Instead, other suitable thickness sensing devices are also applicable, such as, for example, using an optical sensor to detect shifts in the phase of light reflected from the document 60. Furthermore, the actuator 13 for moving the aperture plates 56 may comprise any suitable device having the requisite good response such as, for example, a voicecoil motor or pulse motor.

What is claimed is:

1. An image capture apparatus that optically scans a document as the document is being transported, the image capture apparatus comprising:

transporting means for moving documents along a predetermined path;

first and second plates facing each other and between which is guided a document in motion received from the transporting means, at least one of the first and second plates defining an aperture therein through which light from a light source is directed onto a prescribed region of the document in motion therebetween;

detecting means for detecting the thickness of the document moving along the predetermined path and generating an output drive control signal representative of the thickness of said document; and actuator means responsive to the drive control signals received from the drive control means for moving at least one of the first and second plates in a direction that is perpendicular to a document scanning surface to provide a minimum space between the document and the first and second plates that still allows passage of the document between the first and second plates.

2. The image capture apparatus of claim 1 wherein the detecting means comprises:

document thickness detection means provided along the predetermined path for detecting the thickness of the document moving along the predetermined path and generating an output thickness measurement signal representative of the thickness of said document; and drive control means responsive to the output thickness measurement signal for outputting drive control signals that are representative of the document thickness as detected by the document thickness detection means.

3. The image capture apparatus of claim 1 wherein each of the first and second plates defines an aperture therein through which light from a light source is directed onto a prescribed region of a first and second opposite surface of the document in motion therebetween for concurrently scanning both sides of the document.

4. The image capture apparatus of claim 3 further comprising a first and a second optical sensor for receiving an image of the prescribed region of the first and second opposite surfaces, respectively, of the document illuminated by the light source through the aperture defined in each of the first and second plates.

5. The image capture apparatus of claim 1 further comprising at least one optical sensor for receiving an image of the prescribed region of the document illuminated by the light source through the aperture defined in at least one of the first and second plates.

6. An image capture apparatus that optically scans a document as the document is being transported, the image capture apparatus comprising:
   transporting means for moving documents along a predetermined path;
   first and second plates facing each other and between which is guided a document in motion received from the transporting means, at least one of the first and second plates defining an aperture therein through which light from a light source is directed onto a prescribed region of the document in motion therebetween;
   document thickness detection means provided in the predetermined path for detecting the thickness of the document moving along the predetermined path and generating an output thickness measurement signal representative of the thickness of said document;
   drive control means responsive to the output thickness measurement signal for outputting drive control signals that correspond to the thickness of the document as detected by the document thickness detection means; and
   actuator means responsive to the drive control signals received from the drive control means for moving at least one of the first and second plates in a direction that is perpendicular to a document scanning surface and provide a minimum space between the document and the first and second plates that still allows passage of the document between the first and second plates.

7. The image capture apparatus of claim 6 wherein each of the first and second plates defines an aperture therein through which light from the light source is directed onto the prescribed region of a first and a second opposite surface of the document in motion therebetween for concurrently scanning both surfaces of the document.

8. The image capture apparatus of claim 7 further comprising first and second optical sensors for receiving an image of the prescribed region of the first and second opposite surfaces, respectively, of the document illuminated by the light source through the aperture defined in each of the first and second plates.

9. The image capture apparatus of claim 6 further comprising at least one optical sensor for receiving an image of the prescribed region of the document illuminated by the light source through the aperture defined in at least one of the first and second plates.

* * * * *